(12) United States Patent
Bourvellec et al.

(10) Patent No.: US 12,434,425 B2
(45) Date of Patent: Oct. 7, 2025

(54) METHOD FOR AUTOMATICALLY VERIFYING THE PRESENCE OF MEMBERS FOR HOLDING PREFORMS IN A HEATING STATION

(71) Applicant: SIDEL PARTICIPATIONS, Octeville-sur-Mer (FR)

(72) Inventors: Loïc Bourvellec, Octeville-sur-Mer (FR); Hervé Pasquier, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 344 days.

(21) Appl. No.: 18/257,276

(22) PCT Filed: Dec. 21, 2021

(86) PCT No.: PCT/EP2021/087055
§ 371 (c)(1),
(2) Date: Jun. 13, 2023

(87) PCT Pub. No.: WO2022/136410
PCT Pub. Date: Jun. 30, 2022

(65) Prior Publication Data
US 2024/0009916 A1    Jan. 11, 2024

(30) Foreign Application Priority Data
Dec. 22, 2020  (FR) ...................... 2013885

(51) Int. Cl.
*B29C 49/78*   (2006.01)
*B29C 49/42*   (2006.01)
(Continued)

(52) U.S. Cl.
CPC .......... *B29C 49/78* (2013.01); *B29C 49/4205* (2013.01); *B29C 49/42065* (2022.05);
(Continued)

(58) Field of Classification Search
CPC ............... B29C 49/06; B29C 49/4205; B29C 49/42065; B29C 49/42085;
(Continued)

(56) References Cited

U.S. PATENT DOCUMENTS 8,235,698 B2   8/2012   Schoenberger et al.
2012/0089252 A1 *  4/2012  Kwirandt .......... B29C 49/42095
                                                     348/94

(Continued)

FOREIGN PATENT DOCUMENTS

EP   0387737 A1    9/1990
EP   3564006 A1 * 11/2019  ......... B29C 49/4205
FR   3080056 A1 * 10/2019  ............. B29C 49/06

OTHER PUBLICATIONS

FR 3080056 A1—Translation (Year: 2019).*
EP-3564006-A1—Translation (Year: 2019).*

*Primary Examiner* — Steven B McAllister
*Assistant Examiner* — Benjamin W Johnson
(74) *Attorney, Agent, or Firm* — Blake T. Hudson; Stephanie L. Davy-Jow (57) ABSTRACT

Provided is a method for verifying holding members in a heating station equipped with a device for transporting the preforms. The device includes a plurality of movable supports circulating in a closed circuit and members for individually holding the preforms by their neck, where each of the holding members is borne by a movable support. The method includes setting the movable supports in movement to bring them successively into an acquisition zone, acquiring an image of each individual holding member in the acquisition zone, and automatically verifying the presence of a holding member on each of the images taken.

11 Claims, 3 Drawing Sheets

(51) Int. Cl.
  B29C 49/64 (2006.01)
  B29C 49/68 (2006.01)
  B29C 49/06 (2006.01)
  B29K 67/00 (2006.01)
  B29L 31/00 (2006.01)

(52) U.S. Cl.
  CPC .... B29C 49/42085 (2022.05); B29C 49/6418 (2013.01); B29C 49/68 (2013.01); B29C 49/06 (2013.01); B29C 49/645 (2022.05); B29C 49/6825 (2022.05); B29C 49/683 (2022.05); B29C 49/6835 (2022.05); B29C 49/6845 (2022.05); B29C 49/685 (2022.05); B29C 2049/78765 (2022.05); B29C 2049/7878 (2022.05); B29C 2949/0715 (2022.05); B29K 2067/003 (2013.01); B29L 2031/7158 (2013.01)

(58) Field of Classification Search
  CPC ... B29C 49/6418; B29C 49/645; B29C 49/68; B29C 49/6825; B29C 49/683; B29C 49/6835; B29C 49/6845; B29C 49/685; B29C 49/78; B29C 2049/78765; B29C 2049/7878; B29C 2949/0715; B29K 2067/003; B29L 2031/7158
  USPC ........................................................ 432/239
  See application file for complete search history.

(56) References Cited

U.S. PATENT DOCUMENTS

| | | | |
|---|---|---|---|
| 2013/0333421 A1* | 12/2013 | Hamaguchi | C03B 37/0146 65/487 |
| 2015/0083364 A1 | 3/2015 | Winzinger | |
| 2016/0023397 A1* | 1/2016 | Van Hamme | B65G 43/08 700/230 |

* cited by examiner

METHOD FOR AUTOMATICALLY VERIFYING THE PRESENCE OF MEMBERS FOR HOLDING PREFORMS IN A HEATING STATION

CROSS-REFERENCE TO RELATED APPLICATIONS

This application is the 35 U.S.C. § 371 national stage of PCT application having serial number PCT/EP2021/087055, filed on Dec. 21, 2021. This application also claims priority to French application having serial number FR2013885 filed on Dec. 22, 2020, which are entirely incorporated herein by reference.

TECHNICAL FIELD OF THE INVENTION

The invention relates to a method for automatically verifying the presence of members for holding preforms made from a thermoplastic material in a heating station, the heating station being provided with a device for transporting the preforms along a heating tunnel, the transport device comprising:
- a plurality of movable supports;
- individual members for holding the preforms by their neck, each of the holding members being borne by a movable support, the holding members being removably fixed to their respective movable supports.

TECHNICAL BACKGROUND

Facilities for mass manufacturing containers from preforms are known in the art. The preforms are generally obtained by injection-molding a thermoplastic material. They are then cooled and stored with a view to their subsequent processing into final containers.

The preforms conventionally comprise a body that is intended to be shaped into a final container during a forming operation, for example by blow-molding or stretch blow-molding, of the wall of the preform. The preforms also comprise a neck that is already molded into its final shape. It is therefore important to protect the neck of the preform so that it is not deformed or damaged during the manufacturing of the final container.

In order to allow the forming of the body of the preform during the forming step, the wall of the body is heated in advance to a sufficient temperature to render it malleable. This heating operation is carried out just before the forming operation by passing the preform through a heating station.

The heating station generally comprises a heating tunnel in which heating devices such as infrared lamps are arranged. The preforms are received by a transport device that conveys the bodies thereof in the heating tunnel. This transport device generally comprises a support that can be moved along the route of the preforms, on which an individual member for holding a preform is mounted.

In order to allow uniform heating of the body of the preforms, the holding members are generally designed to rotate the preform about its main axis during transport. Such holding members are sometimes known as "spinners".

The body of the preform is rendered malleable by heating the thermoplastic material forming the wall thereof, in particular beyond a glass transition temperature.

As explained above, the neck of the preform already has its final shape. Unlike the body of the preform, the neck is therefore kept at a temperature below said glass transition temperature in order to avoid the deformation thereof.

To this end, the heating station is designed so that the body of the preform is received in a "hot" part of the station formed by the heating tunnel, while the neck of the preform, which must remain relatively cold, is received in a "cold" part that is generally situated under the heating tunnel.

Of course, the hot part and the cold part of the heating station are adjacent. In order to reduce the thermal exchanges between the hot part and the cold part, it is known practice to interpose between these two parts thermally protective ramps between which the preforms travel. These protective ramps make it possible to reduce the opening between the heating tunnel and the cold part. The protective ramps are spaced apart in order to form a travel slot the width of which is slightly greater than the outer diameter of the section of preform situated directly under the neck in order to allow the preforms to travel without contact with the protective ramps.

These two protective ramps are generally cooled by the internal circulation of a heat transfer liquid in order to prevent heat from building up in the protective ramps.

In addition, some manufacturing facilities also comprise guide ramps that make it possible to guide the preforms instead of simply cooling them. This is for example the case in heating stations that use laser heating means to heat the body of the preforms.

Furthermore, container manufacturing facilities are designed to make it possible to produce final containers with different formats. This generally results in the use of preforms with different formats depending on the batch of containers to be produced. During a change in container format, it is therefore necessary to adapt the facility, and in particular the heating station, to the dimensions of the new preforms.

This in particular involves changing the holding members in order to adapt them to the inner diameter of the neck of the new format of preform. To this end, the holding members are removably fixed to their movable support, advantageously by quick fixing means.

The change of holding members sometimes gives rise to errors. It is thus possible to omit to provide a movable support with a new holding member. It is also possible to provide a movable support with an unsuitable model of holding member.

This also involves adjusting the spacing of the ramps in order to adapt the width of the slot to the under-neck diameter of the preforms in the new format.

However, the manual adjustment of the width of the slot also requires a great deal of time.

SUMMARY OF THE INVENTION

The invention proposes a method for automatically verifying members for holding preforms made from a thermoplastic material in a heating station, the heating station being provided with a device for transporting the preforms along a heating tunnel, the transport device comprising:
- a plurality of movable supports;
- individual members for holding the preforms by their neck, each of the holding members being borne by a movable support, the holding members being removably fixed to their respective movable supports;
- characterized in that it comprises:
- a step of setting the movable supports in motion in order to bring them in succession into an acquisition zone;

a step of acquiring an image of each individual holding member as each of the movable supports passes through the acquisition zone, by means of an image capturing device;

a step of automatically verifying the presence of a holding member in each of the images taken during the acquisition step, by computer processing of each of the images by means of an electronic control unit.

According to another feature of the method of the invention, when at least one holding member is detected as being absent from a movable support during the verification step, the electronic control unit emits a warning signal.

According to another feature of the method of the invention, the holding member is formed by a mandrel suitable for being inserted into the neck of a preform, each holding member being suitable for being replaced during a change in format of the preforms in order to adapt an outer diameter of the holding member to the inner diameter of the neck of the preform.

According to another feature of the method of the invention, it is triggered after the start of the replacement of the holding members, before the heating station is started up.

According to another feature of the method of the invention, the heating station comprises:

at least one pair of longitudinal ramps that define a slot for the preforms to travel through, at least one of the ramps being transversely movable in order to vary the width of the slot;

at least one motorized device for transversely moving the at least one movable ramp in order to adapt the width of the slot, said motorized device being automatically controlled by an electronic control unit.

According to another feature of the method of the invention, it comprises:

a step of automatically determining the outer diameter of the holding member by computer processing of at least one of the images taken during the acquisition step;

a step of automatically adjusting the width of the slot by moving the at least one movable ramp as a function of the outer diameter determined during the determining step in order to adapt the width of the slot.

According to another feature of the method of the invention, during the acquisition step, the image capturing device takes the profile of the holding member.

According to another feature of the method of the invention, the image capturing device is arranged at a predetermined distance from the holding member during the image acquisition operation.

According to another feature of the method of the invention, the model of the holding member is determined by recognition of a visual mark borne by each of the holding members.

According to another feature of the method of the invention, during the determining step, the outer diameter of the holding member is obtained by multiplying the width of the holding member measured on the image by a predetermined proportionality coefficient.

According to another feature of the method of the invention, during the determining step, the outline of the holding member shown on the image is compared with outlines of holding members stored by the electronic control unit, each stored outline being associated with an outer diameter stored by the electronic control unit.

BRIEF DESCRIPTION OF THE FIGURES

Further features and advantages of the invention will become apparent on reading the following detailed description, which will be more clearly understood with reference to the appended drawings, in which.

DETAILED DESCRIPTION OF THE INVENTION

In the description hereinafter, elements with an identical structure or similar functions will be denoted by the same reference sign.

In the description hereinafter, orientations referred to as longitudinal, from back to front, transverse, from left to right, and vertical, from bottom to top, will be used in a non-limiting manner and indicated by the trihedron "L, V, T" in the figures. The vertical direction is used as a purely geometric reference unrelated to the earth's gravity.

Figure 1:
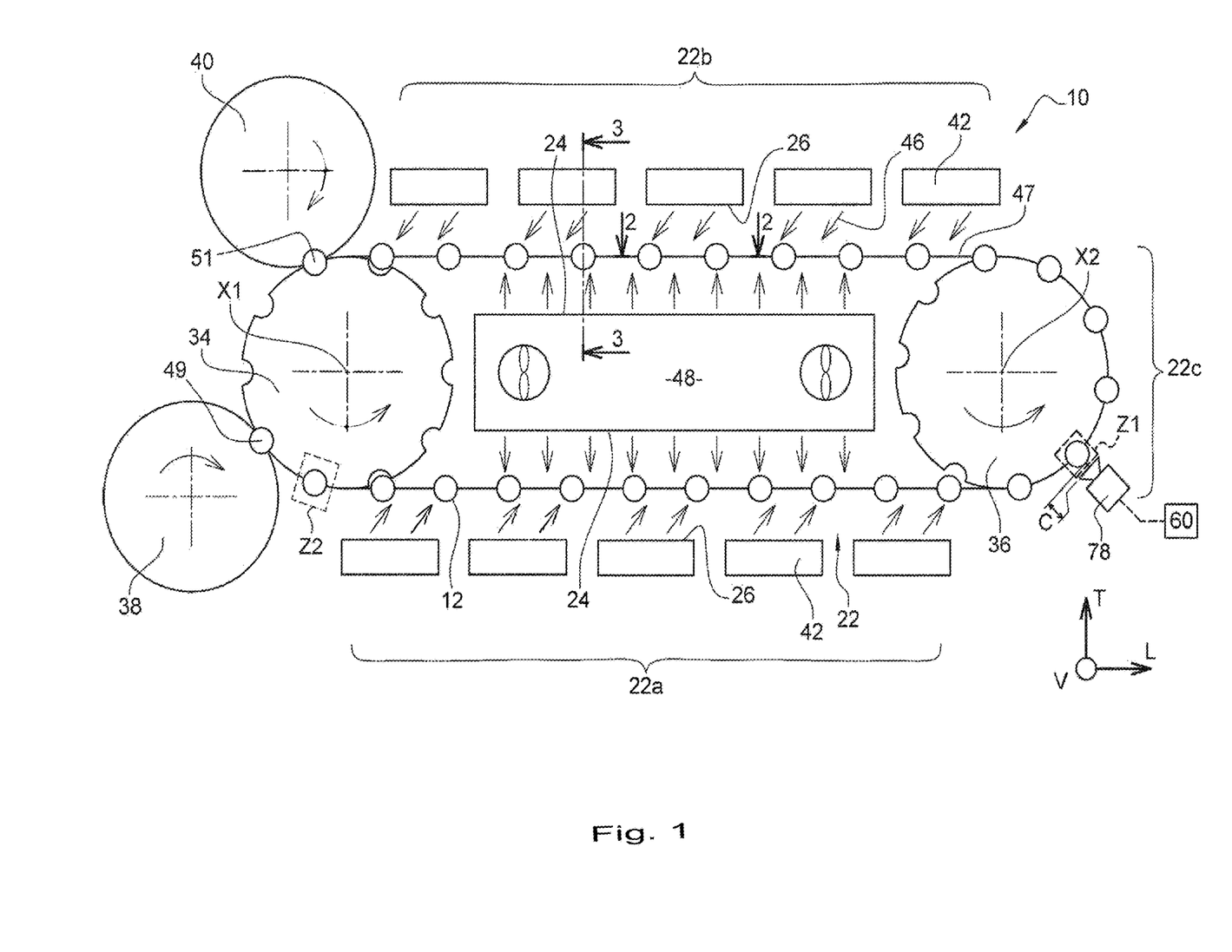
FIG. 1 is a top view schematically showing a preform heating station capable of implementing the verification method of the invention.

FIG. 1 shows a heating station 10 belonging to a facility for manufacturing containers by forming preforms 12 made from a thermoplastic material, such as polyethylene terephthalate (PET), by blow-molding or stretch blow-molding. The preforms 12 travel one after the other along a production route that passes through various processing stations, including the heating station, of the manufacturing facility.

Figure 2:
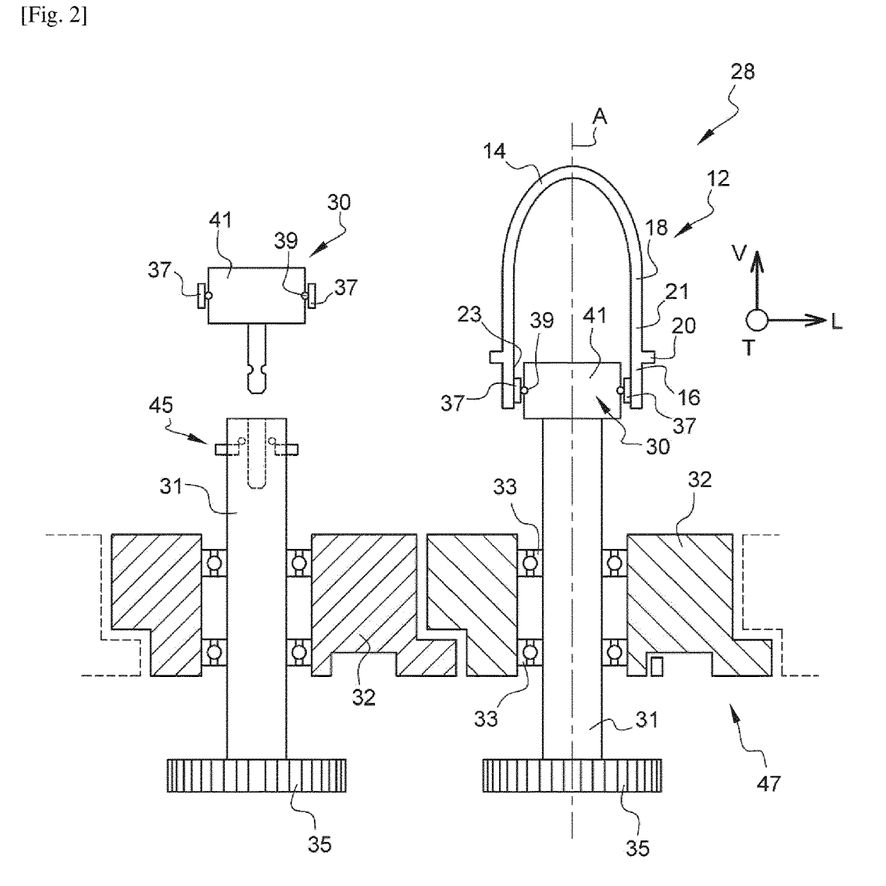
FIG. 2 is a longitudinal cross-sectional view along the line 2-2 in FIG. 1, showing a portion of a device for transporting the preforms through the heating station in FIG. 1, one of the holding members being shown in the mounted position while the other of the members is shown in the mounted position.

As shown in FIG. 2, a preform 12 takes the form of an axisymmetrical hollow body with a main axis "A", which is shown vertically here. The preform 12 is closed at a first axial end by a base 14, shown here at the top, and it is open at an opposite axial end forming a neck 16, shown here at the bottom. The preform 12 is thus axially divided into a first section that extends from the base 14 to the start of the neck 16, this first section commonly being referred to as the body 18 of the preform, and a second section formed by said neck 16. Where it joins the body 18 of the preform 12, the neck 16 comprises a collar 20.

The section of body 18 arranged directly in contact with the collar 20, and shown here just above the neck 16 with reference to FIG. 2, will hereinafter be referred to as the under-neck section 21. The outer diameter of the under-neck section 21 will hereinafter be denoted as the "under-neck diameter D1" (as the preform 12 is shown here upturned in FIGS. 2 and 3).

Furthermore, the neck 16 is internally delimited by an inner cylindrical wall 23 having an inner diameter D2.

In a known manner, the body 18 of the preform 12 is intended to be stretched during an operation for forming the final container, while the neck 16 of the preform 12 already has the shape required for the final container. To this end, the body 18 is intended to be heated in the heating station 10 so that it becomes malleable, while the neck 16 is intended to remain temperate in the heating station 10 to prevent it from being deformed.

With reference to FIG. 1, the heating station 10 comprises a heating tunnel 22 that here has two longitudinal sections 22a, 22b connected to each other by an end bend 22c. Each longitudinal section 22a, 22b of the heating tunnel 22 is transversely delimited by an inner wall 24 and an outer wall 26.

The heating station 10 further comprises a device 28 for transporting the preforms 12 in a line along the heating tunnel 22 along a heating path that forms a section of the production route. Here, the preforms 12 are transported with their axis "A" extending vertically and the neck 16 facing downward on the longitudinal sections 22a, 22b and on the end bend 22c in order to protect the neck 16 from the heat. The main axis "A" of the preforms 12 is thus orthogonal to their direction of travel along the heating path.

As a variant, not shown, the invention is also applicable to preforms that are transported with the neck upward.

The transport device 28 is shown in greater detail in FIG. 2. It comprises a plurality of movable supports 32 circulating along a predetermined circuit. Here, it is a closed circuit.

As a variant of the invention, not shown, the movable supports travel along an open circuit.

The transport device 28 further comprises individual members 30 for holding the preforms 12 by their neck 16. Each of the holding members 30 is borne by an associated movable support 32. In addition, each holding member is capable of rotating the preform 12 that it is holding about its vertical axis "A" on its route through the heating station 10. This rotation makes it possible to ensure uniform heating of the body 18 of the preform 12. Such an assembly is also known as a "spinner".

Each holding member 30 is rigidly mounted for conjoint rotation on a shaft 31 with a vertical axis "A" that is rotatably mounted in a bearing 33 for guiding the associated movable support in order to make it possible to rotate the preform 12. Here, the holding member 30 is mounted at the upper end of the shaft 31 with reference to FIG. 2. Here, the shaft 31 has at its lower end a pinion 35 that is suitable for interacting with a rack (not shown) that is arranged along the trajectory of the movable support 32 in order to rotate it.

As a variant, not shown, the shaft is rotated by means of an electric motor carried on the movable support.

Here, each holding member 30 is formed by a mandrel that is arranged coaxially with the axis "A" of rotation. The mandrel is suitable for being inserted axially into the neck 16 of the container with a tight fit in order to ensure that the preform 12 is immobilized by friction with the inner cylindrical wall 23 of the neck 16. Here, the mandrel comprises at least three segments 37, two of which can be seen in cross-section in FIG. 2, and which are arranged about the axis "A" of rotation. Each segment 37 is pushed radially outward in an expanded position by a ring 39 made from an elastomer material that is interposed between a central part 41 of the holding member 30 that is fixed relative to the shaft 31. Each segment 37 is thus suitable for being pushed radially against the inner cylindrical wall 23 of the neck 16 to grip the preform 12 by friction. In this regard, the portion of the holding member 30 intended to be received tightly inside the neck 16 has, in the expanded state, an outer diameter "D3" that is slightly larger than the inner diameter D2 of the neck 16 of the preforms 12 intended to be received. The outer diameter "D3" of the holding member 30 is for example equal to the sum of the inner diameter "D2" of the neck 16 and a predetermined additional thickness "s", for example of the order of one millimeter.

The heating station 10 is generally designed to make it possible to process different models of preforms 12 in batches. The inner diameter "D2" of the neck 16 can vary from one model to another. When the processing of a new batch of preforms 12 having a different inner diameter "D2" of the neck 16 from the preforms 12 of the preceding batch is planned, it is thus necessary to change all of the holding members 30 of the heating station 10 in order to adapt them to the new format of preforms 12.

To this end, each holding member 30 is removably fixed to an associated movable support 32. More particularly, here, the holding member is removably fixed to an upper axial end of the shaft 31. In FIG. 2, the left-hand shaft 31 is shown without a holding member 30, while the right-hand shaft 31 is shown provided with a holding member 30.

The holding member 30 can be mounted on its associated movable support 32 by any known means, for example by screwing. However, the holding member 30 is advantageously provided with quick fixing means 45 that allow mounting and removal without tools. These are for example quick-lock fitting means, such as a ball lock.

In the example shown in the figures, the movable supports 32 are mounted articulated in pairs in order to form the links of a closed chain 47. The movable supports 32 are more particularly articulated with each other about an axis parallel to the axis "A" of a preform 12 thus received by a holding member 30. The preforms 12 are thus conveyed by a closed chain 47 of movable supports 32.

As a variant, the movable supports are formed by shuttles that circulate on a rail, each shuttle forming a linear motor with the rail.

When the preforms 12 are intended to circulate neck downward, as is the case here, the movable supports 32 are advantageously also pivotably mounted relative to each other about a longitudinal axis in order to allow the preforms 12 to be upturned during transport. This thus makes it possible to receive the preforms 12 neck upward, then heat them neck downward, before turning them neck upward again at the exit from the heating station 10.

Again with reference to FIG. 1, the chain 47 is guided and set in motion by meshing around two guide wheels 34, 36. Each guide wheel 34, 36 is rotatably mounted about an associated central vertical axis "X1, X2". The guide wheels 34, 36 are arranged at the two longitudinal ends of the longitudinal sections 22a, 22b of the heating tunnel 22.

At least one of the guide wheels 34, 36 is rotated in order to move the holding members 30. For example, one of the two guide wheels 34, 36 is driven by a motor while the other of the two guide wheels 34, 36, referred to as the driven wheel, is rotated by the chain 47.

As a variant, each of the two guide wheels is rotated by a motor, for example by means of a brushless motor. The two guide wheels are jointly rotated. This advantageously makes it possible to reduce the tension in the chain.

As a variant, not shown, the invention is also applicable to a transport device comprising movable supports forming independent shuttles that travel along a rail. Each shuttle forms a linear electric motor with the rail, for example.

The first guide wheel 34 is configured to make it possible to load cold preforms 12 at a loading point 49 situated upstream of the first longitudinal section 22a. The cold preforms 12 are delivered by an input wheel 38. The first guide wheel 34 is also configured to make it possible to unload the hot preforms 12 at an unloading point 51 situated downstream of the second longitudinal section 22b and upstream of the loading point 49. The hot preforms 12 are received by an output wheel 40.

The second guide wheel 36 makes it possible to make the end bend 22c of the heating tunnel 22 between the two longitudinal sections 22a, 22b.

At least one of the two guide wheels 34, 36 is rotated in an anti-clockwise direction with reference to FIG. 1. The preforms 12 thus travel longitudinally in succession toward the front along the heating path through the first tunnel section 22a, then on the end bend 22c and finally longitudinally toward the back through the second tunnel section 22b.

Figure 3:
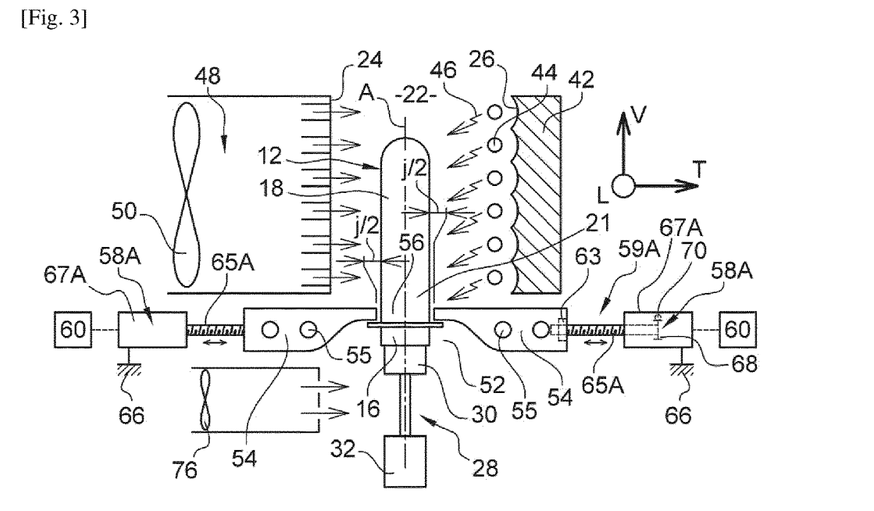
FIG. 3 is a transverse cross-sectional view along the line 3-3 in FIG. 1, showing a heating tunnel of the heating station in FIG. 1.

According to a non-limiting exemplary embodiment of the heating station 10 shown in FIG. 3, here, the outer wall 26 of the heating tunnel 22 is formed by the inner face of a plurality of heating modules 42. Each heating module 42 comprises radiant heating means that radiate heat radiation 46 generally transversely toward the inside of the heating tunnel 22. In a non-limiting manner, here, these are lamps 44 emitting in the infrared spectrum.

Here, the inner wall 24 of the heating tunnel 22 is formed by a face of a cooling unit 48. Here, the cooling unit 48 is arranged transversely between the two longitudinal tunnel sections 22a, 22b. As shown schematically in FIG. 3, the cooling unit 48 comprises ventilation means such as a fan 50 blowing a forced air stream that is directed transversely toward the inside of the tunnel 22 through a grille formed in the inner wall 24.

The tunnel 22 is intended to receive the bodies 18 of the upturned preforms 12 with the neck 16 downward, their axis "A" extending vertically, in order to allow them to be heated to the temperature for the subsequent operation for forming the final containers.

As a variant, not shown, the preforms travel upright, neck upward.

The tunnel 22 emerges vertically downward into a corridor 52 in which the necks 16 of the preforms 12 travel. As explained above, the necks 16 of the preforms 12 must be temperate, that is, kept at a temperature below the glass transition temperature of the material from which they are made.

When the heating modules 42 comprise radiant heating means, the radiation is emitted in all directions, including toward the neck 16 of the preforms 12. In order to limit the passage of heat radiation from the tunnel 22 toward the corridor 52, or the passage of hot air by convection, at least one pair of ramps 54 for thermally protecting the necks 16 of the preforms 12 is interposed vertically between the tunnel 22 receiving the bodies of the preforms and the corridor 52 receiving the necks 16 of the preforms. The protective ramps 54 thus vertically define the tunnel 22. The protective ramps 54 extend parallel to each other in a longitudinal direction. Here, each longitudinal section 22a, 22b is provided with a pair of protective ramps 54.

The upper face of each protective ramp 54, facing toward the tunnel 22, advantageously forms a reflective surface that makes it possible to reflect the heat radiation toward the body 18 of the preform 12. In order to prevent heat from building up in the protective ramps 54, each protective ramp 54 is advantageously provided with cooling means 55 such as a cooling circuit in which a heat transfer fluid circulates.

In addition, in order to prevent the heat passing through a slot 56 from heating the air contained in the corridor 52, second ventilation means 76 can be arranged to blow a forced air stream transversely into the corridor 52 in order to expel the hot air from it, as shown in FIG. 2.

According to a variant embodiment of the heating station, not shown, the heating means are formed by members emitting heating laser radiation. The body of the preforms is then heated locally substantially without the heat radiating in all directions. In this case, the ventilation means do not need to be as powerful as in the heating configuration using radiant heating means. Furthermore, here, the preforms preferably circulate neck upward, as the tunnel is not exposed to significant radiation and the neck is therefore less likely to be heated by convection, as in the first embodiment. In this variant embodiment, the heating station is also provided with at least one pair of ramps, but here, these are ramps for guiding the preforms. The ramps do not therefore act as a thermal shield as is the case for the thermally protective ramps. Such guide ramps are thus similar to those shown in FIG. 3, but they do not have the cooling means.

Hereinafter, the term "ramps 54" will be used without distinction to denote the protective ramps of the embodiment shown in FIG. 3 and the guide ramps of the variant embodiment not shown, the invention being applicable independently to the embodiment illustrated and to the variant embodiment not shown.

The ramps 54 are generally arranged on the longitudinal sections 22a, 22b of the tunnel 22. The heating station 10 thus generally comprises two pairs of ramps 54, each arranged in an associated longitudinal section 22a, 22b of the tunnel 22, while the bend 22c is not provided with ramps.

The ramps 54 in a pair are arranged in the same transverse and longitudinal plane, on either side of the heating path of the preforms 12. To this end, the ramps 54 are transversely spaced apart to leave the longitudinal slot 56 for the preforms 12 to travel through.

The ramps 54 in a pair are arranged level with the under-neck section 21, that is, above the collar 20 of the preforms 12 when they are traveling with the neck 16 downward or below the collar 20 when they are traveling with the neck 16 upward.

In a production mode of the heating station, the slot 56 has a transverse width equal to the sum of the under-neck diameter "D1" of the preform 12 and a transverse clearance "j", as shown in FIG. 3. The transverse clearance "j" is divided into two substantially equal parts "j/2" on either side of the preform 12 to allow it to travel between the ramps 54 without contact with them. The clearance "j" is thus equal to the sum of the parts "j/2+j/2". Here, the width of the slot 56 is less than the outer diameter of the collar 20 of the preforms 12.

In order to make it possible to adapt the width of the slot 56 to a plurality of formats of preforms 12, at least one ramp 54 in a pair is transversely movably mounted relative to the heating tunnel 22. This makes it possible to vary the width of the slot 56. In the example shown in FIG. 3, the two ramps 54 in the pair are transversely movably mounted relative to the heating tunnel 22.

Furthermore, the transverse movement of the ramps 54 is controlled by a motorized transverse movement device 58A in order to automatically adapt the width of the slot 56. The motorized transverse movement device 58A is capable of being automatically controlled by an electronic control unit 60.

As a variant of the invention, not shown, the heating module is also transversely movably mounted relative to the trajectory of the preforms. The heating module is for example rigidly connected to the ramp or is independently movable by means of a mechanism similar to the mechanism for moving the ramps.

Here, the motorized transverse movement device 58A of a ramp 54 comprises a plurality of transverse movement mechanisms 59A that are mounted along the ramp 54. Here, each transverse movement mechanism 59A is formed by a mechanical jack. Such a transverse movement mechanism 59A comprises a nut 63 that is fixedly mounted on the protective ramp 54 and a rod 65A that is threaded here, as illustrated in FIG. 3. The rod 65A can be transversely rotatably guided in a fixed housing 67A relative to a frame 66 of the heating station 10. The frame 66 is more particularly fixed relative to the ground on which it is resting.

The rod 65A is connected to means that rotate it. Here, these rotating means comprise a toothed wheel 68 that is rigidly connected to the rod 65A for rotation therewith. The toothed wheel 68 is associated with a threaded shaft 70. This threaded shaft 70 extends longitudinally all along the associated ramp 54, meshing with the toothed wheel 68 of each transverse movement mechanism 59A associated with said ramp 54. Here, the toothed wheel 68 is accommodated in the fixed housing 67A.

Figure 4:
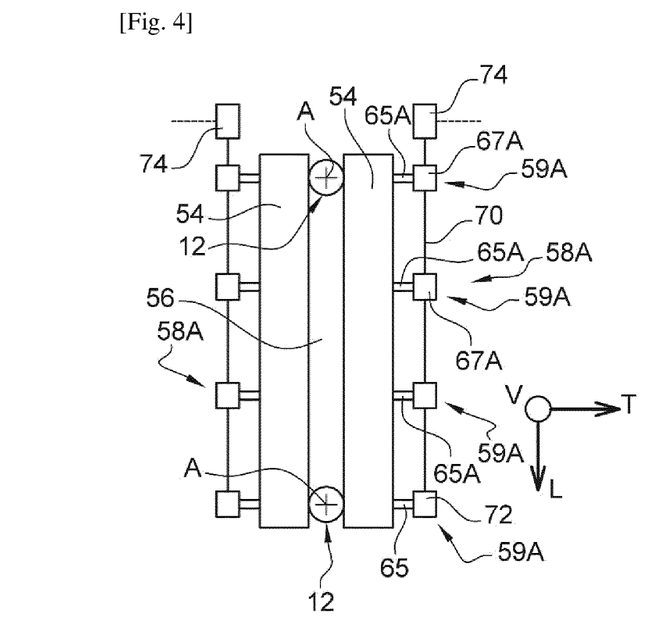
FIG. 4 is a bottom view schematically showing thermally protective ramps that border the heating tunnel of the heating station in FIG. 1.

The rotation of the threaded shaft 70 is controlled by an electric motor 74 arranged at the end of the shaft, as illustrated in FIG. 4. Depending on the direction of rotation of the electric motor 74, this causes the transverse translational movement of the protective ramp 54 in one direction or the other, to space apart the protective ramps 54 or bring them together.

The motors 74 of the motorized transverse movement devices 58A are automatically controlled by the electronic control unit 60.

The motors 74 controlling the transverse movement of the ramps 54 in the same pair are capable of being controlled simultaneously in order to simultaneously bring together or space apart the two protective ramps 54 relative to each other by the same distance. The ramps 54 are thus always symmetrical relative to the same fixed mid-plane relative to the frame 66, regardless of the width of the slot 56. When they travel between the ramps 54 in the pair, the main axis "A" of the preforms 12 is substantially contained in this mid-plane.

Of course, the motorized transverse movement device is described as a non-limiting example here. The invention is applicable to movement devices with different designs, such as pneumatic jacks, hydraulic jacks, linear electric motors, etc.

During a change in format of preforms 12, more particularly when the preforms 12 of the next batch have a different inner diameter D2 of the neck 16 from the preforms 12 of the preceding batch, it is necessary to replace the holding members 30 of a first model suitable for the preforms 12 of the preceding batch with holding members 30 of a second model suitable for the preforms 12 of the next batch in order to adapt them to the inner diameter D2 of the next preforms 12.

To this end, the heating station 10 operates in an adjustment mode during which no preforms 12 are transported by the transport device 28. In adjustment mode some functions, such as the heating, are not yet fully active, as opposed to a production mode in which all of the functions, including the heating function, are active.

During such a change, the holding members 30 of the first model are all removed from their movable support 32, then the holding members 30 of the second model are mounted in their place on each movable support 32.

The invention proposes a method for verifying the holding members after they have been replaced. This method is suitable for being applied to each holding member 30 replaced in this way. It can therefore be triggered following the replacement of all of the holding members 30 or during the replacement of the holding members. The method is implemented before the heating station is started up in production mode. This makes it possible to avoid any risk of malfunction linked to an error during the replacement of the holding members 30.

In order to implement the method, the manufacturing facility is provided with an image capturing device 78, as shown in FIG. 1. The image capturing device 78 is for example a camera or photographic device with a digital sensor capable of taking a digital image. The image capturing device 78 is arranged so that it can take an image of each holding member 30 along the closed circuit.

More specifically, here, the image capturing device 78 is arranged in the heating station 10 so that it takes an image of each holding member 30 along the heating path. The image capturing device 78 is more particularly arranged so that it takes an image of the holding member 30 when the associated movable support 32 passes through a predetermined acquisition zone "Z1" of the heating path.

More specifically, here, the image capturing device 78 is arranged so that it takes the profile of each holding member 30 in a radial direction relative to the axis "A".

Here, the acquisition zone "Z1" is arranged on the end bend 22c. Here, the image capturing device 78 is arranged on the outside of the end bend 22c. This arrangement is particularly advantageous as this area of the heating station 10 generally has sufficient free space to receive the image capturing device 78. Furthermore, the tunnel 22 is not provided with heating means on the bend 22c, which makes it possible to avoid the image capturing device 78 being damaged by excessively high temperatures.

As a variant, the acquisition zone can be arranged at any other point of the closed circuit situated in an area allowing the arrangement of an image capturing device.

Each of the steps of the positioning method is carried out automatically by the electronic control unit 60.

Figure 5:
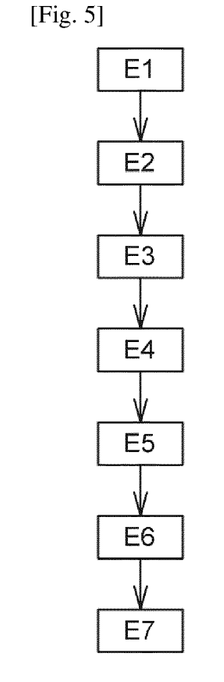
FIG. 5 is a block diagram showing the method of the invention.

During a first circulation step "E1", the movable supports 32 are set in motion along their closed circuit so that each movable support 32 is brought in succession into the acquisition zone "Z1". The holding members 30 circulate empty, that is, without preforms.

This first step "E1" can be triggered after all of the holding members have been replaced. In this case, the movable supports 32 can move continuously or intermittently during the entire verification method.

This first step "E1" can also be triggered before all of the holding members 30 have been replaced. In this case, the movement of the movable supports 32 must be stopped temporarily in order to allow the replacement of the holding members 30 as the movable supports 32 pass through a changing zone "Z2".

The method also comprises a second step "E2" of acquiring an image of each individual holding member 30 as each of the movable supports 32 passes through the acquisition zone "Z1", by means of the image capturing device 78.

This second step "E2" is triggered when each movable support 32 that has undergone the replacement operation in the replacement zone "Z2" reaches the acquisition zone "Z1".

As a variant, when all of the holding members 30 have be replaced in advance, this second step "E2" starts at the same time as the first step "E1" of setting them in motion.

The method comprises a third step "E3" of automatically verifying the presence of a holding member 30 on each of the images taken during the acquisition step "E2", by computer processing of each of the images by means of the electronic control unit 60.

This third step "E3" can be carried out for each image directly after it has been taken during the second acquisition step "E2".

As a variant, this third step "E3" is carried out following the second acquisition step "E2", when an image has been taken for each of the movable supports 32 passing through the acquisition zone "Z1".

The method comprises a fourth warning step "E4" that is triggered when at least one holding member 30 is detected as being absent from a movable support 32 during the verification step "E3", in which the electronic control unit 60 emits a warning signal. This signal allows an operator to rectify this omission by providing the movable support 32 in question with a holding member 30.

Advantageously, the electronic control unit 60 makes it possible to find which movable support 32 does not have a holding member 30 as a function of the position of the corresponding image in the image acquisition chronology.

Each of the steps E1 to E4 of the method is iterated until the presence of a holding member 30 has been verified on each movable support 32.

In addition, during a change of format of preforms, the ramps 54 must also be precisely positioned so as to ensure that the slot 56 is sufficiently wide to allow the preforms 12 to travel satisfactorily. The slot 56 must however be narrow enough to minimize the transmission of heat, by radiation or convection, between the tunnel 22 and the corridor 52, if the ramps 54 are thermally protective ramps, or to allow effective guiding of the preforms, if the ramps 54 are guide ramps.

The invention optionally proposes a method for automatically positioning the ramps 54 in a pair during the method for verifying the holding members 30.

With reference to FIG. 5, the verification method comprises a fifth step "E5" of automatically determining the outer diameter "D3" of the holding member 30, which is triggered after the acquisition step "E2".

During this step, the outer diameter "D3" of the holding member 30 is determined by computer processing by the electronic control unit 60 of the image of said holding member 30 taken during the acquisition step "E2".

According to a first embodiment of the fifth determining step "E5", the outer diameter "D3" of the holding member 30 is determined by recognition of a visual mark borne by each of the holding members 30.

For example, this is a bar code or a matrix code, such as a QR code, that is applied to each of the holding members 30. This code appears on each of the images taken during the acquisition step "E1". The electronic control unit is thus able to identify and read the information contained in the code. The code itself can directly contain the outer diameter of the holding member 30.

As a variant, the code contains a reference number of the holding member 30. In this case, the electronic control unit 60 comprises a previously stored database that makes it possible to match each reference number to an outer diameter "D3" of the holding member 30.

According to a second embodiment of the fifth determining step "E5", the outer diameter "D3" of the holding member 30 is determined by shape recognition on the image of said holding member 30 taken during the acquisition step "E2".

To this end, the image capturing device 78 is advantageously arranged at a predetermined distance "C" from a holding member 30 the movable support 32 of which is situated in the acquisition zone "Z1" during the image acquisition operation. This makes it possible to know the scale at which the holding member 30 appears on the image without needing to refer to a visual reference. The image capturing device 78 is designed and positioned so that it takes a digital image of the holding member 30 with sufficiently high resolution to carry out the operations that make it possible to determine the outer diameter "D3" of the holding member 30 to within less than one millimeter.

For example, the electronic control unit 60 measures the outer diameter "D3" of the holding member 30 on the image. Then, the electronic control unit 60 multiplies said dimension measured on the image by a predetermined proportionality coefficient "K". The proportionality coefficient "K" is in particular calculated as a function of different known parameters such as the distance between the image capturing device 78 and the features of the lens with which it is provided.

The proportionality coefficient "K" can also be defined experimentally during a prior calibration operation.

According to one variant embodiment of this fifth determining step "E5", the outline of the holding member 30 shown in the image, referred to as the "detected outline", is compared with the outlines of holding members previously stored in the electronic control unit 60, referred to as "standard outlines". The number of formats of holding members 30 with which the heating station 10 can be provided is generally limited. It is thus possible to exhaustively store a standard outline for each of these formats of holding member 30 in the electronic control unit 60.

Each standard outline stored is associated with an outer diameter "D3" stored in a database of the electronic control unit 60.

When the particular shape and dimensions of the detected outline correspond substantially to those of a stored similar standard outline, the electronic control unit 60 is thus capable of automatically identifying the standard outline among the stored standard outlines by shape recognition. The electronic control unit 60 is then able to find the corresponding outer diameter "D3" in the database.

The method also comprises a sixth step "E6" of automatically adjusting the width of the slot 56 by moving the at least one movable ramp 54 as a function of the under-neck diameter "D1" determined during the fifth step "E5" of determining the outer diameter "D3" in order to adjust the width of the slot 56 to a passage width equal to the under-neck diameter "D1" plus the transverse clearance "j" determined. The under-neck diameter "D1" is determined by adding a predetermined dimension, corresponding to the nominal thickness of the wall of a preform minus the additional thickness "s", to the outer diameter "D3" of the holding member 30.

Here, the two ramps 54 in the pair are controlled to move simultaneously. To this end, the electronic control unit 60 controls the motorized transverse movement devices 58A. This sixth step "E6" of adjusting the width occurs chronologically after the second step "E2" of determining the under-neck diameter "D1".

Advantageously, the method further comprises a seventh warning step "E7" that is triggered for each holding member 30 following the detection step "E5". During this warning step "E7", it is verified that all of the holding members installed on the movable supports 32 have the same outer diameter "D3" or that each holding member 30 has an outer diameter "D3" that complies with a setpoint value previously entered into the electronic control unit 60.

If this is not the case, a warning message is sent to the operator. This step makes it possible to avoid one of the holding members 30 having an outer diameter unsuitable for the format of the preforms 12 intended to be received when production resumes.

The verification method thus makes it possible to quickly and automatically verify that the operations to replace the holding members 30 have been carried out without any errors.

The invention claimed is:

1. A method for automatically verifying the presence of holding members (30) for holding preforms (12) made from a thermoplastic material in a heating station (10), the heating station (10) being provided with a transport device (28) for transporting the preforms (12) along a heating tunnel (22), the transport device (28) comprising:
   a plurality of movable supports (32);
   individual holding members (30) for holding the preforms (12) by their neck (16), each of the holding members (30) being borne by a movable support (32), the holding members (30) being removably fixed to their respective movable supports (32);
   wherein the method comprises:
   a step (E1) of setting the movable supports (32) in motion in order to bring them in succession into an acquisition zone (Z1);
   a step (E2) of acquiring an image of each individual holding member (30) as each of the movable supports (32) passes through the acquisition zone (Z1), by means of an image capturing device (78);
   a step (E3) of automatically verifying the presence of a holding member (30) on each of the images taken during the acquisition step (E2), by computer processing of each of the images by means of an electronic control unit (60).

2. The method as claimed in claim 1, wherein when at least one holding member (30) is detected as being absent from a movable support (32) during the verification step (E3), the electronic control unit (60) emits a warning signal.

3. The method as claimed in claim 1, wherein the holding member (30) is formed by a mandrel suitable for being inserted into a neck (16) of one of the preforms (12), each holding member (30) being suitable for being replaced during a change in format of the preforms (12) in order to adapt an outer diameter (D3) of the holding member (30) to an inner diameter (D2) of the neck (16) of the preform (12).

4. The method as claimed in claim 3, wherein the method is triggered after the start of a replacement of the holding members (30), before the heating station is started up.

5. The method as claimed in claim 4, wherein the heating station (10) comprises:
   at least one pair of longitudinal ramps (54) that define a slot (56) for the preforms (12) to travel through, at least one of the ramps (54) being transversely movable in order to vary the width of the slot (56);
   at least one motorized device (58A) for transversely moving the at least one movable ramp (54) in order to adapt the width of the slot (56), said motorized device (58A) being automatically controlled by the electronic control unit (60).

6. The method as claimed in claim 5, further comprising:
   a step (E5) of automatically determining the outer diameter (D3) of the holding member (30) by computer processing of at least one of the images taken during the acquisition step (E2);
   a step (E6) of automatically adjusting the width of the slot (56) by moving the at least one movable ramp (54) as a function of the outer diameter (D3) determined during the determining step (E5) in order to adapt the width of the slot (56).

7. The method as claimed in claim 1, wherein, during the acquisition step (E2), the image capturing device (78) takes an image of the profile of the holding member.

8. The method as claimed in claim 7, wherein the image capturing device (78) is arranged at a predetermined distance (C) from the holding member during the image acquisition operation.

9. The method as claimed in claim 6, wherein a model of the holding member is determined by recognition of a visual mark borne by each of the holding members.

10. The method as claimed in claim 8, wherein during a determining step (E5), the outer diameter (D3) of the holding member (30) is obtained by multiplying a width of the holding member (30) measured on the image by a predetermined proportionality coefficient (K).

11. The method as claimed in claim 8, wherein during a determining step (E5), an outline of the holding member (30) shown on the image is compared with outlines of holding members (30) stored by the electronic control unit (60), each stored outline being associated with an outer diameter (D3) stored by the electronic control unit (60).

* * * * *